United States Patent [19]

Murray

[11] 4,448,221

[45] May 15, 1984

[54] SPRAYING APPARATUS FOR CLEANING FILTER PLATES

[75] Inventor: James D. Murray, Birmingham, Ala.

[73] Assignee: Passavant Corporation, Birmingham, Ala.

[21] Appl. No.: 389,178

[22] Filed: Jun. 17, 1982

[51] Int. Cl.³ .............................................. B08B 3/02
[52] U.S. Cl. ...................................... 134/76; 134/152; 134/172; 118/315; 239/275
[58] Field of Search ..................... 134/76, 77, 82, 83, 134/112, 151, 152, 153, 172, 180, 181, 198, 199; 239/275, 450; 118/315, 323

[56] References Cited

U.S. PATENT DOCUMENTS

| | | | |
|---|---|---|---|
| 3,633,651 | 1/1972 | Ruhlandt | 134/172 |
| 4,076,033 | 2/1978 | Busse et al. | 134/198 |
| 4,107,042 | 8/1978 | Heinrich et al. | 134/172 |
| 4,129,137 | 12/1978 | Kurita et al. | 134/198 |

*Primary Examiner*—Robert L. Bleutge
*Attorney, Agent, or Firm*—Woodford R. Thompson, Jr.

[57] ABSTRACT

Spraying apparatus for cleaning filter plates embodies a support frame which is mounted for movement beneath the filter plates and is adapted to align with each space formed between adjacent filter plates to be cleaned. A spraying unit mounted for pivotal movement on the support frame selectively to a lowered position beneath the filter plates and to a raised position extending upwardly into the space between adjacent filter plates. A spray dispenser carried by the spraying unit moves within the space to apply spray to the adjacent vertical surfaces of the filter plates being cleaned.

6 Claims, 16 Drawing Figures

SPRAYING APPARATUS FOR CLEANING FILTER PLATES

BACKGROUND OF THE INVENTION

This invention relates to spraying apparatus for cleaning horizontally displaced filter plates of a filter press.

In plate type filter presses, especially those used to dewater sewage sludge, filter cake accumulates in the chambers formed between adjacent filter plates and is discharged when the plates are pulled apart. The filter cloth on each vertical face of each filter plate tends to get clogged after a period of use, thus causing a considerable decrease in the permeability of the cloth. Accordingly, each filter cloth must be cleaned from time to time to maintain its filtering rate and performance.

With rectangular filter plates, conventional spraying apparatus is usually employed to wash the filter plates with the spray tubes of such apparatus moving either horizontally or vertically in the space between adjacent filter plates to be cleaned. Cleaning fluid under pressure is discharged from the spray tubes to clean the plates as the spray tubes move relative to the adjacent surfaces of the filter plates being cleaned. As illustrated in U.S. Pat. Nos. 3,780,747 and 4,076,033, cumbersome and complicated support frames and drive assemblies are required to move such cleaning apparatus. Such support frames are usually operatively connected to the upper supports for the filter press which in turn carries the filter plates. These support frames are adapted to travel along such supports and align the spray tubes with the space defined between adjacent filter plates to be cleaned.

So far as I am aware, such conventional filter plate washers are adapted for use only with square and rectangular filter plates. Circular filter plates are usually washed by a hand operated hose assembly having a right angle spray nozzle at its discharge end. Cleaning fluid under high pressure is discharged through the nozzle as the person handling the hose moves the spray nozzle back and forth relative to the filter plate until it is cleaned. This is a time consuming operation which must be repeated for each circular filter plate being cleaned. In the event the hose assembly should be accidentally dropped or otherwise allowed to get out of control, very dangerous and unsafe working conditions would be created due to the discharge of cleaning fluid from the hose under high pressure.

While U.S. Pat. Nos. 3,620,233 discloses a filter plate washer adapted for movement beneath the filter plates and carries a horizontal spray tube, lifting means is employed to raise and lower the horizontal spray tube in a vertical direction. With this particular arrangement, the spray tube remains horizontal at all times while moving relative to the filter plates being cleaned. To use such apparatus for washing circular filter plates would be unsatisfactory due to the fact that a substantial amount of the cleaning fluid would not strike the filter plates but would pass outside the perimeter of the filter plates. Not only would cleaning fluid be wasted, but unsafe working conditions would be created by the discharge of cleaning fluid outside the perimeter of the filter plates.

Other conventional spraying devices with which I am familiar are disclosed in U.S. Pat. No. 3,633,651 and Switzerland Pat. No. 445,455.

SUMMARY OF THE INVENTION

In accordance with my invention, I overcome the above and other difficulties by providing spraying apparatus for cleaning circular filter plates which is simple of construction, economical of manufacture and eliminates cumbersome and complicated movable support frames and drive assemblies heretofore required with conventional spraying apparatus.

A primary object of my invention is to provide improved spraying apparatus for cleaning circular filter plates which is very efficient in operation and eliminates the use of the hand operated hose assembly heretofore employed for washing circular filter plates.

Another object of my invention is to provide improved spraying apparatus which automatically moves into alignment with the space defined between adjacent filter plates independently of the judgment of the operator.

A further object of my invention is to provide improved spraying apparatus in which all runs of the spray dispenser relative to the filter plates are active runs thereby eliminating any idle runs of the spray dispenser back to its original position.

A still further object of my invention is to provide improved spraying apparatus which is adapted for lateral movement to operative positions relative to adjacent longitudinally extending filter presses thereby eliminating the need for each filter press to have its own filter plate washer.

Another object of my invention is to provide spraying apparatus for cleaning circular filter plates which is adapted to pivot into the space between adjacent filter plates being cleaned and then direct the entire discharge of cleaning fluid under pressure into engagement with the filter plates without any waste of cleaning fluid.

My improved spraying apparatus embodies a support frame mounted for longitudinal movement beneath a filter press and adapted for alignment with the space defined between adjacent filter plates as they are pulled off the stack of filter plates to be cleaned. A spraying unit is mounted for pivotal movement on the support frame selectively to a first position for free movement beneath the filter plates and to a second position in alignment with and extending into the space defined between adjacent filter plates to be cleaned. A spray dispenser is carried by the spraying unit and is adapted to move within the space between the vertical surfaces of adjacent filter plates being cleaned.

DESCRIPTION OF THE DRAWINGS

Apparatus embodying features of my invention is illustrated in the accompanying drawings, forming a part of this application, in which:

FIG. 4$^a$ is a fragmental, sectional view taken generally along the line 4$^a$—4$^a$ of FIG. 4 and showing the support frame moving between basins in dotted lines;

DETAILED DESCRIPTION

Figure 1:
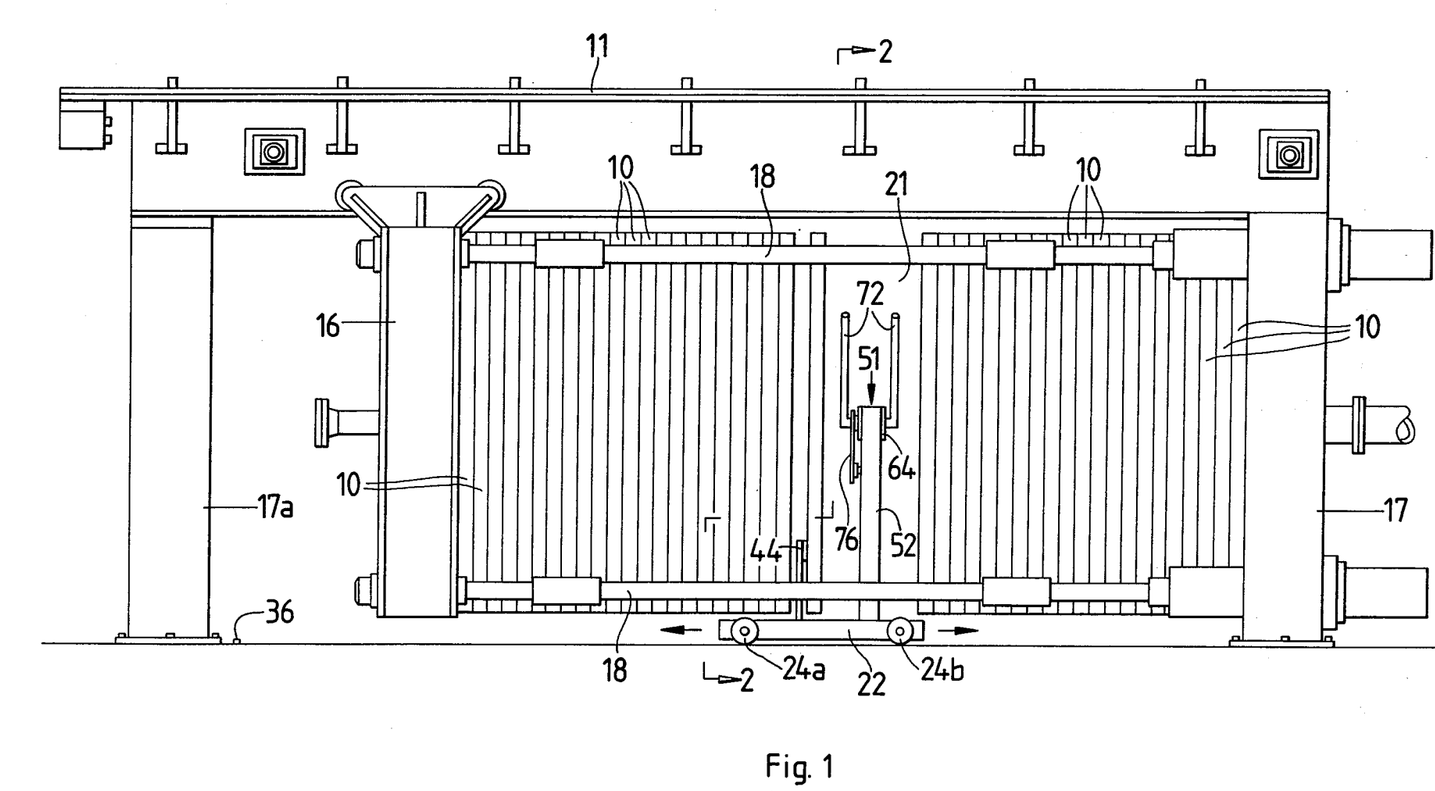
FIG. 1 is a side elevational view showing a conventional filter press with my improved spraying unit in its second position for applying spray.
Figure 2:
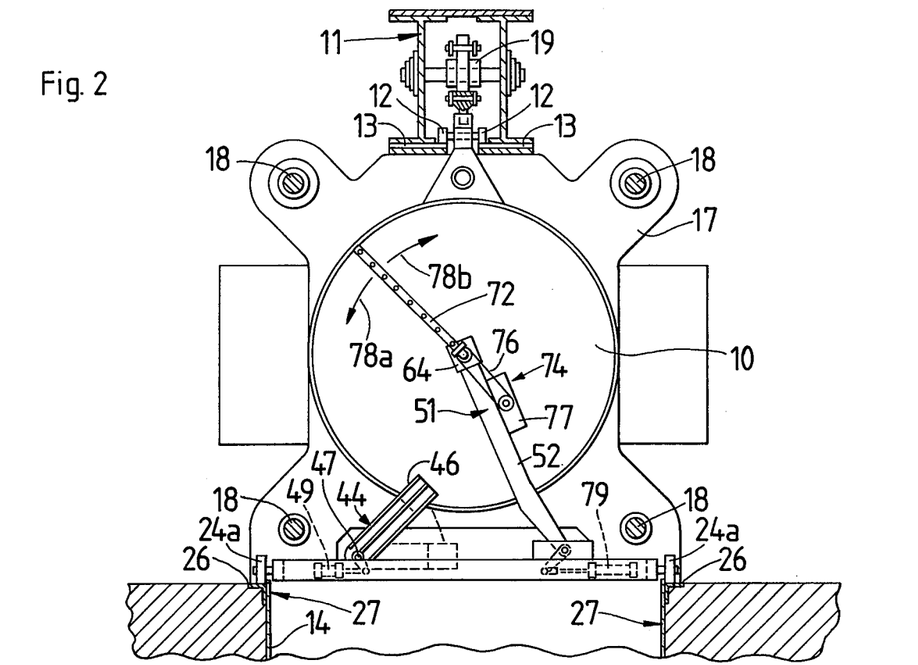
FIG. 2 is a vertical sectional view taken generally along the line 2—2 of FIG. 1.
Figure 3:
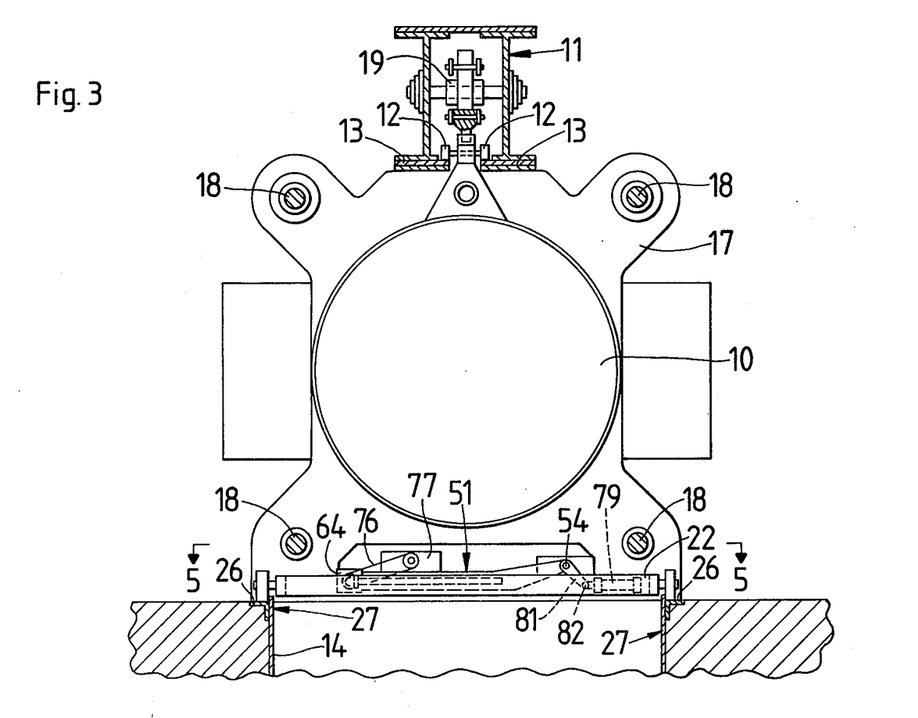
FIG. 3 is a vertical sectional view corresponding to FIG. 2 showing the spraying unit in its first position beneath the filter press.

Referring now to the drawings for a better understanding of my invention, I show in FIG. 1 a conventional, elongated platetype filter press having a plurality of vertically extending circular filter plates 10 suspended from a centrally disposed upper support member indicated generally at 11. Rollers 12 are carried by the upper portion of each filter plate 10 in position to engage a lower flange 13 of the upper support member 11, as shown in FIGS. 2 and 3. The filter plates 10 are thus adapted for horizontal movement relative to the upper support member 11 selectively to closed working positions and to spaced apart open positions where the filter cake formed in the working position is discharged into a basin 14 which extends longitudinally beneath the filter press.

As shown in FIG. 1, a filter plate follower 16 is suspended from the upper support member 11 and is adapted to move along the upper support member 45 toward and away from a stationary head stand 17 of the filter press. The filter plate follower 16 cooperates with tension rods 18 to move the filter plates 10 toward the head stand 17 and into their closed working positions. After the filter cake is formed, the filter plate follower 16 is moved rearwardly toward a tail stand 17$^a$ of the filter press. This permits a filter plate separator 19, shown in FIGS. 2 and 3, to move each filter plate 10 sequentially away from the stack of filter plates to be cleaned. As each circular filter plate is moved off the stack and away from the head stand 17, a space 21 is created between adjacent filter plates to be cleaned.

Figure 5:
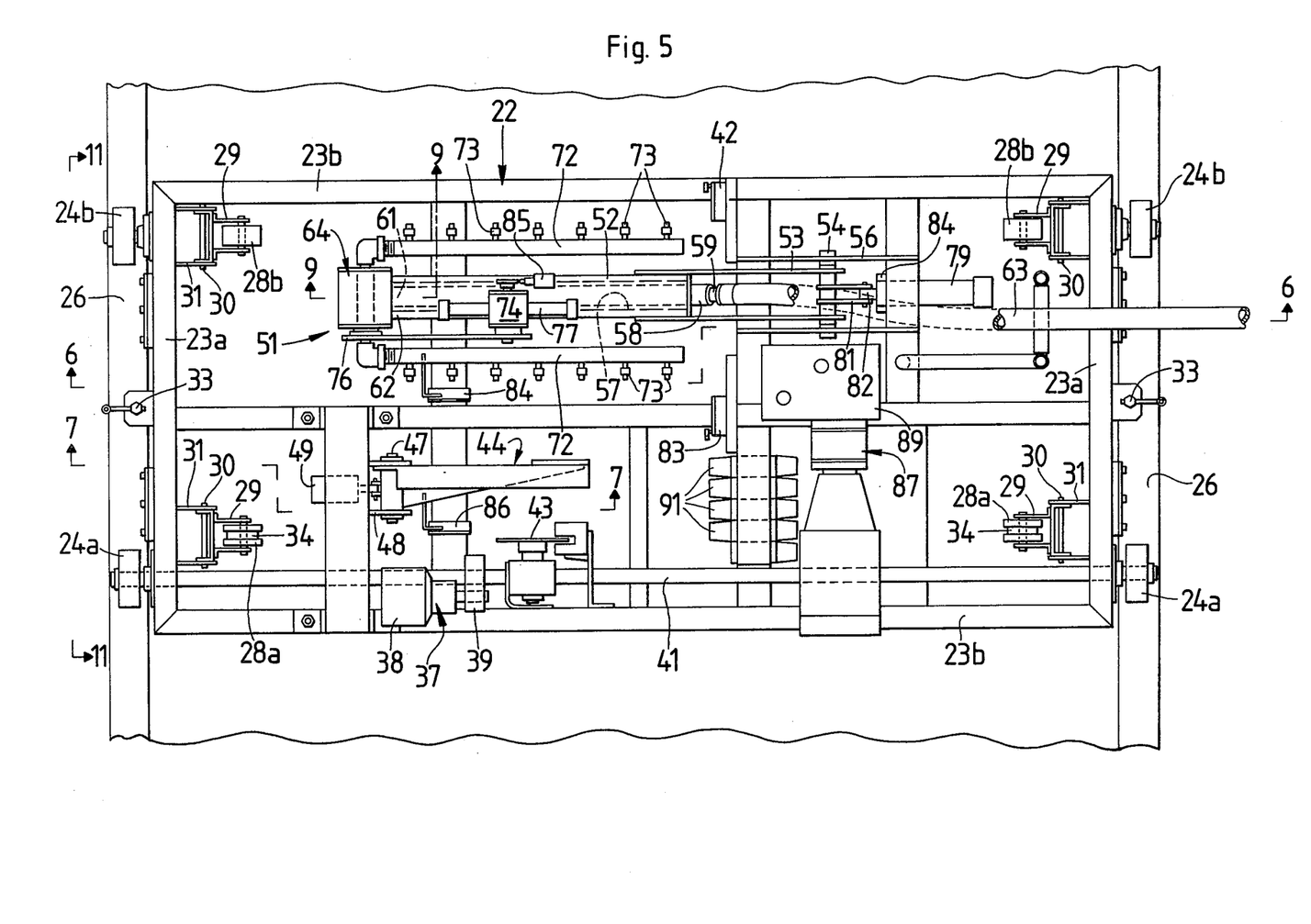
FIG. 5 is an enlarged plan view taken generally along the line 5—5 of FIG. 3.

My improved spraying apparatus for cleaning such circular filter plates 10 embodies a support frame 22 which is mounted for longitudinal movement beneath the filter press and is adapted for alignment with each space 21 defined between adjacent filter plates to be cleaned. The support frame 22 is formed from conventional tubular members 23$^a$ and 23$^b$ which are secured to each other in a rectangular configuration, as shown in FIG. 5. That is, adjoining end portions of the tubular members 23$^a$ and 23$^b$ are secured to each other with fluid-tight connections formed by suitable means, such as by welding. The support frame 22 thus forms a fluid-tight reservoir for a hydraulic pump assembly to be described hereinafter.

As shown in FIG. 5, a pair of outwardly projecting supporting wheels 24$^a$ and 24$^b$ are carried by each tubular member 23$^a$. The wheels 24$^a$ and 24$^b$ provide means for moving the support frame 22 longitudinally beneath the filter press and are in position to engage the upper surfaces 26 of longitudinally extending guide rails 27 which are secured to the upper rim of the basin 14, as shown. The guide rails 27 center the support frame 22 over the basin 14 and also guide the support frame along an approximate straight-line longitudinal path of movement beneath the filter press.

Figure 4:
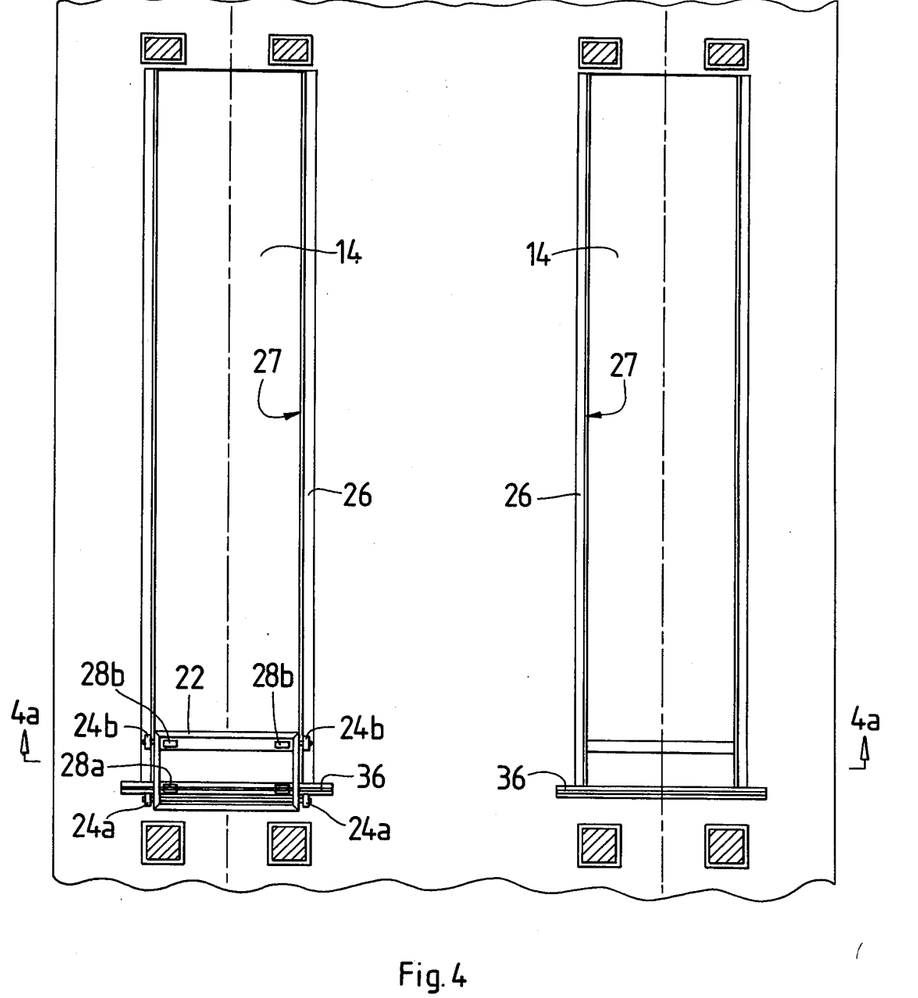
FIG. 4 is a plan view showing adjacent filter cake basins with the support frame of my spraying apparatus positioned over one of the basins.
Figure 4A:
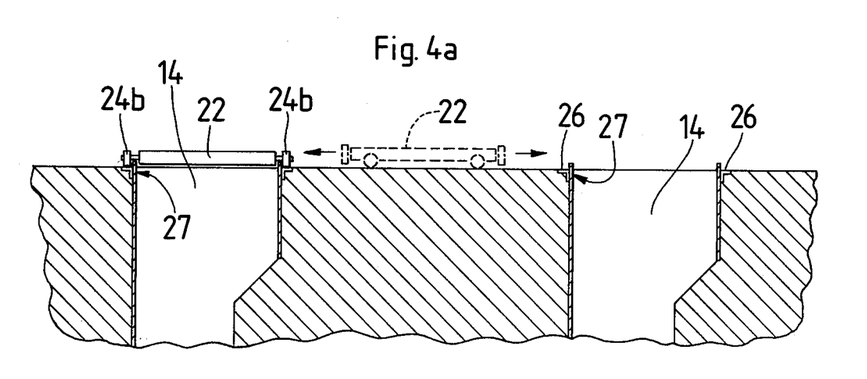
Figure 6:
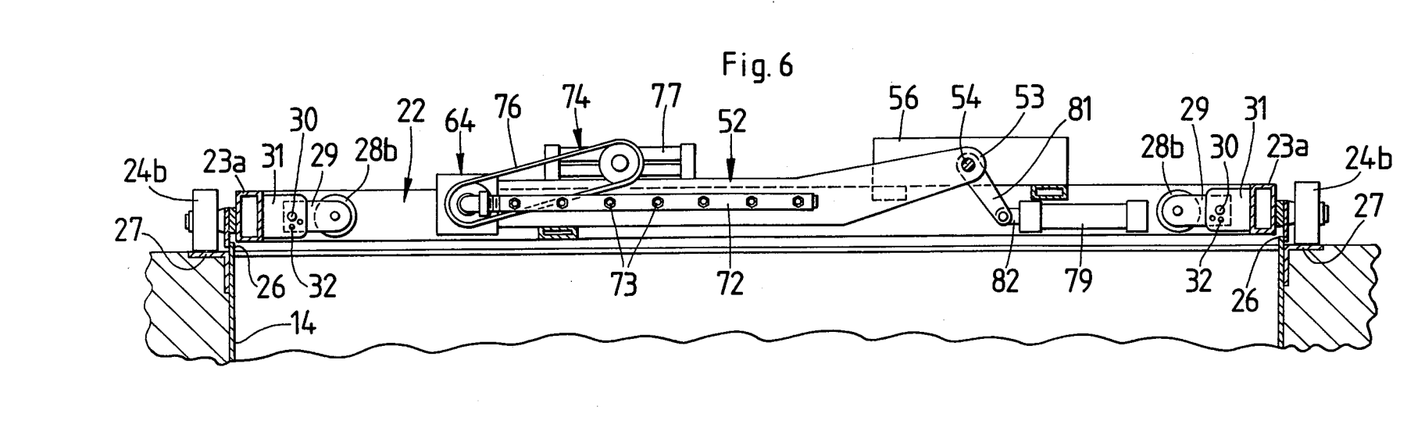
FIG. 6 is a vertical sectional view taken generally along the line 6—6 of FIG. 5.
Figure 7:
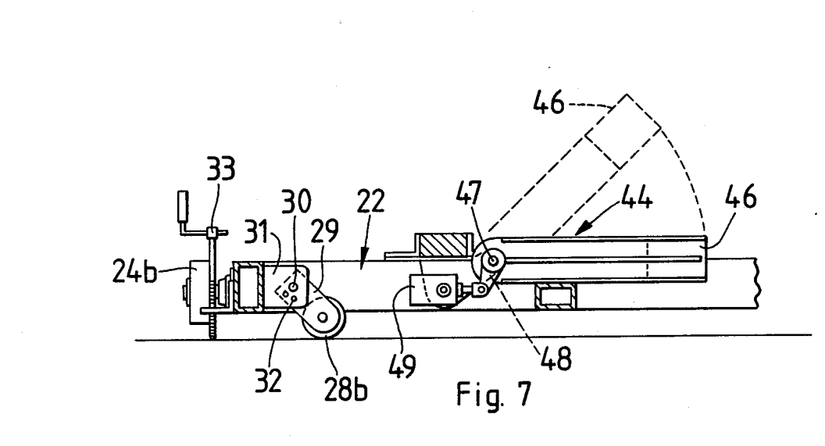
FIG. 7 is a fragmental, sectional view taken generally along the line 7—7 of FIG. 5.

Mounted on and projecting inwardly of each tubular member 23$^a$ is a pair of spaced apart wheels 28$^a$ and 28$^b$. These wheels provide means for moving the support frame 22 laterally relative to adjacent filter cake basins 14 which extend in parallel relation to each other, as shown in FIGS. 4 and 4$^a$. The wheels 28$^a$ and 28$^b$ are carried by brackets 29 which are pivotally connected by pins 30 to laterally and inwardly projecting brackets 31 carried by the support frame 22. The wheels 28$^a$ and 28$^b$ may be locked in selected raised and lowered, positions relative to the support frame 27 by suitable locking pins 32, as shown in FIGS. 6 and 7. That is, when the support frame 22 is moved laterally from a position beneath one filter press to a position beneath an adjacent filter press, conventional jack screws 33 carried by the support frame raise the support frame and wheels 24$^a$ and 24$^b$ to clear the guide rails 27. The wheels 28$^a$ and 28$^b$ are then pivoted downward and locked in a lowered position in contact with the rim of the basin by the pins 32, as shown in FIG. 7. Each wheel 28$^a$ is provided with an annular recess 34 which is adapted to ride along an elongated bar 36 carried by and extending across one end of the basin 14, as shown in FIGS. 1 and 4. This arrangement provides proper positioning of the support frame 22 beneath each filter press and over the subjacent basin 14 with each lateral movement of the support frame beneath selected filter presses. After the support frame 22 is moved over a basin 14, the jack screws 33 are actuated to raise the support frame whereby the wheels 28$^a$ and 28$^b$ may be pivoted upwardly and locked in a raised position to clear the guide rails 27, as shown in FIG. 6. The support frame 22 is then lowered until the wheels 24$^a$ and 24$^b$ engage the guide rails 27.

A conventional hydraulically actuated drive unit 37 such as a reversible hydraulic motor 38 is carried by the support frame 22 for imparting longitudinal movement thereto, as shown in FIG. 1. The motor 38 is operatively connected by means of a power transmitting assembly 39 to an elongated drive shaft 41 which extends between and carries the wheels 24$^a$. The power transmitting assembly may assume various forms such as a chain and sprocket drive, belt and pulley drive, a spur gear assembly or the like. As shown in FIG. 5, a suitable limit switch 42 carried by the support frame 22 cooperates with the motor 38 to control longitudinal movement of the support frame 22 into alignment with each space 21 created between adjacent filter plates as they are moved away from the stack of filter plates to be cleaned.

A conventional brake 43 is carried by the support frame 22 to positively stop and lock the support frame in alignment with each space 21 defined between adjacent filter plates being cleaned. The positive stop provided by the brake 43 thus avoids any unintentional movement of the support frame during the cleaning cycle. The limit switch 42 also activates the brake 43 whereby it locks the support frame 22 in place upon each sequential movement of the support frame into alignment with a newly created space 21.

A hydraulic actuated stop assembly 44 is carried by the support frame 22 and is adapted for pivotal movement to selected positions relative to the support frame, as shown in dotted and in solid lines in FIG. 2. As the filter plate separator 19 moves a filter plate 10 away from the stack, the stop assembly 44 pivots to a first position, shown in solid lines, wherein the stop assembly engages and stops the moving filter plate at a predetermined distance from the adjacent filter plate in the stack. After the facing vertical surfaces of the two adjacent filter plates have been cleaned, the stop assembly 44 pivots downwardly to a second position, shown in dotted lines, beneath the filter plate 10 to thus permit free longitudinal travel of the support frame 22 beneath the filter press. The stop assembly 44 comprises a stop arm 46 which is pivotally connected by a pin 47 to a mounting bracket 48 carried by the support frame 22, as shown in FIG. 5. An actuator member, such as a hydraulic cylinder 49, is operatively connected to the stop arm 46 for imparting pivotal movement to the stop arm 46 whereby it moves to selected positions, as shown in FIG. 2. The limit switch 42 is also utilized to activate the stop assembly 44. That is, each time the support frame 22 moves toward the head stand 17 it trips the limit switch 42, which in turn activates the cylinder 49 to pivot the stop arm 46 to its raised or first position. Each traveling filter plate 10 which is set in motion sequentially by the filter plate separator 19, will come to rest against the stop arm 46 and thus form the space 21 between adjacent filter plates to be cleaned.

A spraying unit, indicated generally at 51, is carried by the support frame 22 and is mounted for pivotal movement thereon to selected positions, as shown in FIGS. 1, 2, 3, 6 and 8. That is, the spraying unit 51 is adapted to pivot to a lower or first position, as shown in FIGS. 3 and 6, beneath the filter plates to thus permit free longitudinal travel of the support frame 22 beneath the filter press. As shown in FIGS. 1 and 2, the spraying unit 51 is also adapted for pivotal movement to a raised or second position wherein it extends upwardly and inwardly of the space 21 to a location adjacent the mid portions of the adjacent filter plates 10 to be cleaned. The spraying unit 51 includes an elongated arm 52 which is pivotally connected at one end 53 by a pin 54 to a bracket 56 carried by the support frame 22. While the elongated arm 52 is shown as being a tubular member having a passageway 57 therethrough, it will be apparent that it may assume other forms.

A fluid supply conduit 58 extends through the passageway 57, as shown, and has an inlet end 59 adjacent the end 53 of the elongated arm 52 and an outlet end 61 adjacent the other end 62 of the elongated arm 52. The inlet end 59 is connected by a fluid-tight connection to a flexible fluid supply conduit 63 which is connected to a separate cleaning fluid supply system, not shown.

Figure 9:
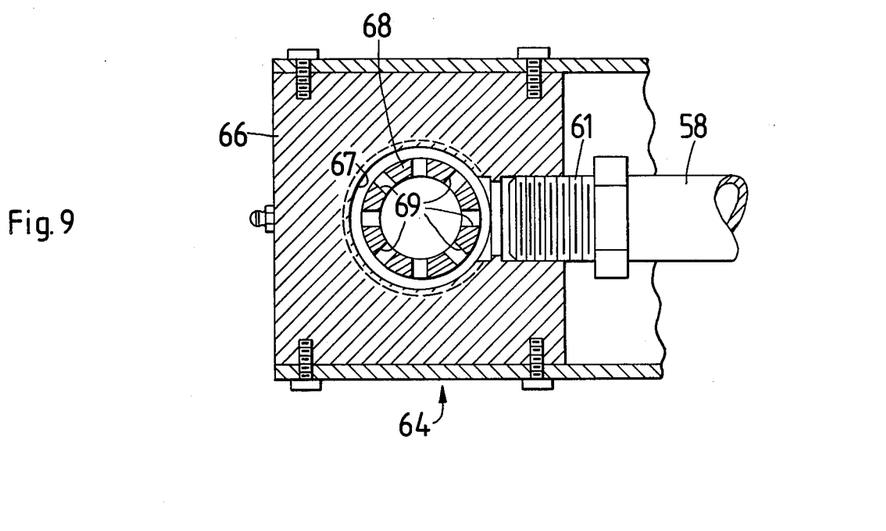
FIG. 9 is an enlarged, fragmental sectional view taken generally along the line 9—9 of FIG. 5.
Figure 10:
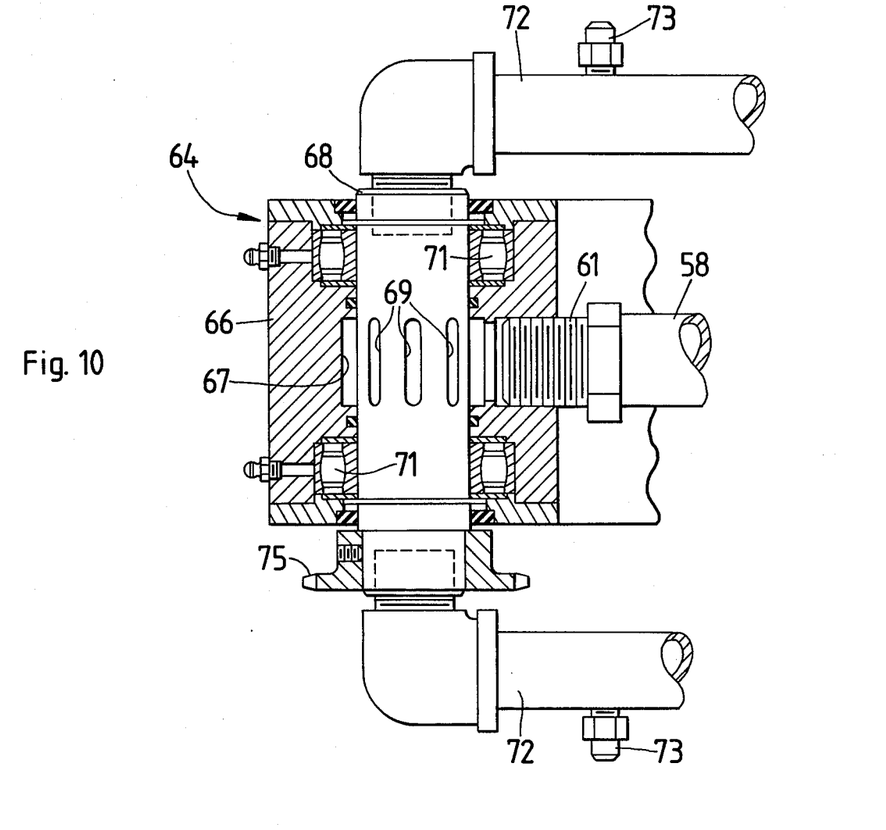
FIG. 10 is a sectional view taken generally along the line 10—10 of FIG. 9.
Figure 11:
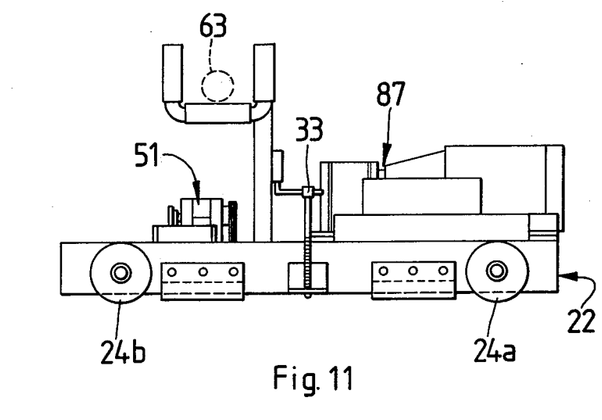
FIG. 11 is a side elevational view taken generally along the line 11—11 of FIG. 5.
Figure 12:
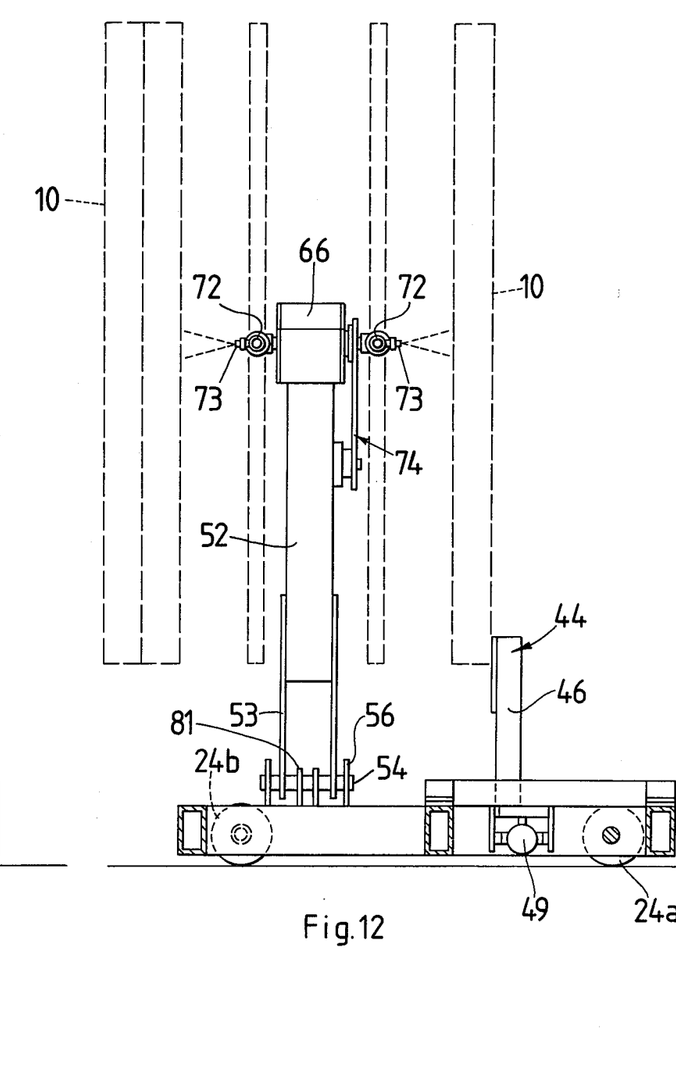
FIG. 12 is a side elevational view taken generally along the line 12—12 of FIG. 8.

Mounted for rotation on the end 62 of the elongated arm 52 is a spray dispenser 64 which comprises a fluid-tight housing 66 having a cavity 67 therein which communicates with the outlet end 61 of the fluid supply conduit 58, as shown in FIGS. 9 and 10. A rotatable conduit 68 having elongated slots 69 adjacent the mid portion thereof extends through the housing 66 and is supported by suitable bearings 71 for rotation within the housing with a fluid-tight fit. A spray manifold 72 having spaced apart spray nozzles 73 along one side thereof is secured to each end of the rotatable conduit 68, as shown. When the spraying unit 51 is moved to the raised or second position, the spray nozzles 73 of each manifold 72 project laterally toward the vertical surface of an adjacent filter plate to be cleaned.

Figure 8:
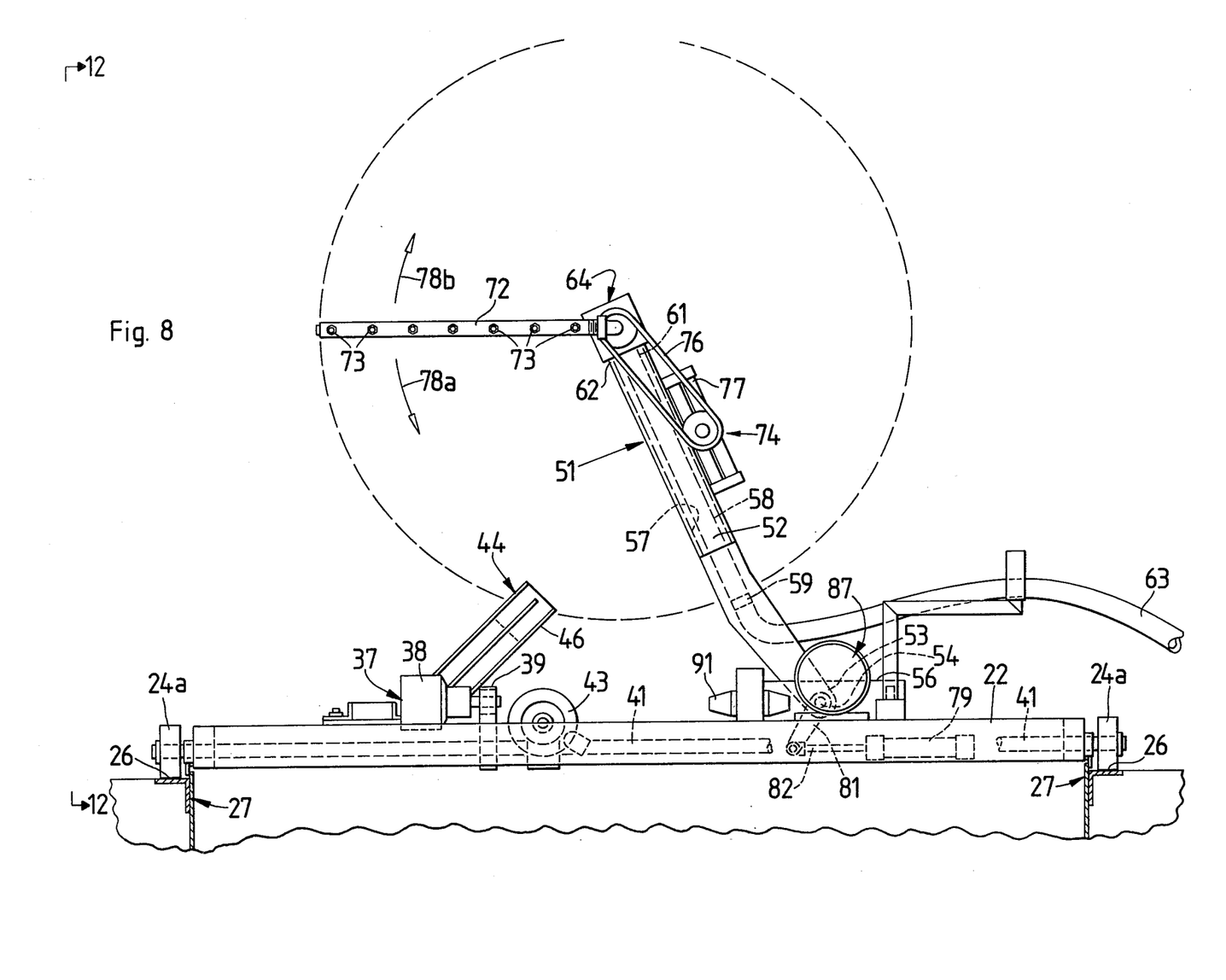
FIG. 8 is a side elevational view corresponding to FIG. 6 showing the spraying unit pivoted to its operating or second position.

A rotary actuating unit 74, which includes a chain drive assembly 76 and a conventional linear actuator 77, is carried by the elongated arm 52 to impart 360° rotation to the spray manifolds 72 in both directions, as shown in FIGS. 2 and 8. That is, the chain drive assembly 76 is operatively connected to a sprocket 75 carried by the rotatable conduit 68 and transmits power from the linear actuator 77 to the rotatable conduit 68. Accordingly, movement of the linear actuator in one direction imparts rotation to the spray manifolds 72 in a first direction and movement by the linear actuator in a reverse direction imparts rotation to the manifolds 72 in a reverse direction, as shown by the arrows $78^a$ and $78^b$, respectively, in FIGS. 2 and 8.

An actuator, such as a conventional hydraulic cylinder 79, is carried by the support frame 22 and is adapted to impart pivotal movement to the elongated arm 52 selectively to its raised and lowered position, as shown in FIGS. 2, 3, 6 and 8. An arm 81 is connected non-rotatably at one end to the pin 54 and is pivotally connected at its other end to the outer free end of a piston rod 82 of the cylinder 79 whereby the elongated arm 52 is pivoted to its raised and lowered position in response to extension and retraction, respectively, of the rod 82.

When the spraying unit 51 is pivoted to its second or raised position, cleaning fluid, such as water, is pumped under pressure through the flexible conduit 63 to the fluid supply conduit 58 where it is discharged into the cavity 67 of the housing 66, as shown in FIGS. 9 and 10. After the cleaning fluid passes through the elongated slots 69 of the rotatable conduit 68 it enters each spray manifold 72 and is then discharged through the spray nozzles 73 as the manifolds rotate within the space 21.

As shown in FIG. 5, additional limit switches 83, 84, 85 and 86 are mounted at various locations on the support frame 22. The limit switch 83 deenergizes the drive means for the filter plate separator 19 in response to contact with a traveling filter plate 10 which has been set in motion by the filter plate separator. The limit switch 84 is operatively connected to the control means for the cylinder 79 whereby it stops upward movement of the elongated arm 52 as it reaches its raised or second position whereupon it then starts the rotary actuator 74. The limit switch 85 is carried by the elongated arm 52 in position to be activated in response to rotation of one of the spray manifolds 72 a predetermined angular distance to reverse the direction of rotation of the manifolds 72. The limit switch 86 is activated in response to downward movement of the stop arm 46 a predetermined angular distance whereupon it releases the brake 43 and energizes the drive motor 38.

A conventional hydraulic pump assembly 87 is carried by the support frame 22, as shown. The hydraulic pump assembly communicates with a tank or reservoir 89 and the reservoir formed by the tubular members $23^a$ and $23^b$, as described above, to supply hydraulic fluid to the drive motor 38, brake 43, stop assembly 44 and spraying unit 51. Suitable control valves 91 are carried by the support frame 22 adjacent the pump assembly 87 for regulating the flow of hydraulic fluid to and from the drive motor 38, brake 43, stop assembly 44 and spraying unit 51 in a manner well understood in the art to which my invention relates.

From the foregoing description, the operation of my improved spraying apparatus for cleaning circular filter plates will be readily understood. With the filter plates 10 in their closed working positions and the support frame 22 beneath the filter press adjacent the tail stand 17$^a$, the support frame 22 is driven forward until the limit switch 42 is tripped by the closed stack of filter plates. This stops the drive motor 38, activates the brake 43 and pivots the stop arm 46 to its first or raised position. The filter press separator 19 engages the rearmost filter plate and begins moving it toward the open position. The traveling filter plate activates the limit switch 83 which in turn deenergizes the drive means for the filter plate separator 19 and raises the spraying unit 51 from its lowered or first position to its raised or second position within the space 21, as shown in FIGS. 2 and 8. In response to raising the elongated arm 52 the limit switch 84 is activated and thus causes cleaning fluid to be directed to the spraying unit 51 and starts operation of the rotary actuator 74. The spray manifolds 72 are then rotated 360° in one direction to apply spray to the vertical surfaces of adjacent filter plates being cleaned. Upon rotation of the spray manifolds 72 a predetermined angular distance the limit switch 85 is actuated to reverse the direction of rotation of the spray manifolds 72. If more than one wash cycle is required, the direction of rotation of the rotary actuator is reversed whereby the direction of rotation of the spray manifolds 72 is also reversed. Accordingly, the wash cycle may be repeated until the desired number of cycles has been completed.

After the wash cycle has been completed and the spraying manifolds 72 are returned to their original positions, the spraying unit 51 and the stop assembly 44 are caused to pivot downwardly beneath the filter plates 10 as described hereinabove and as shown in FIGS. 3 and 6. Downward movement of the stop arm 46 actuates the limit switch 86 whereby the brake 43 is released and the drive motor 38 is energized to move the support frame 22 forward toward the head stand 17 until the closed stack of filter plates 10 trip the limit switch 42. The sequence of steps described above are repeated until all of the filter plates 10 have been cleaned.

Figure 13:
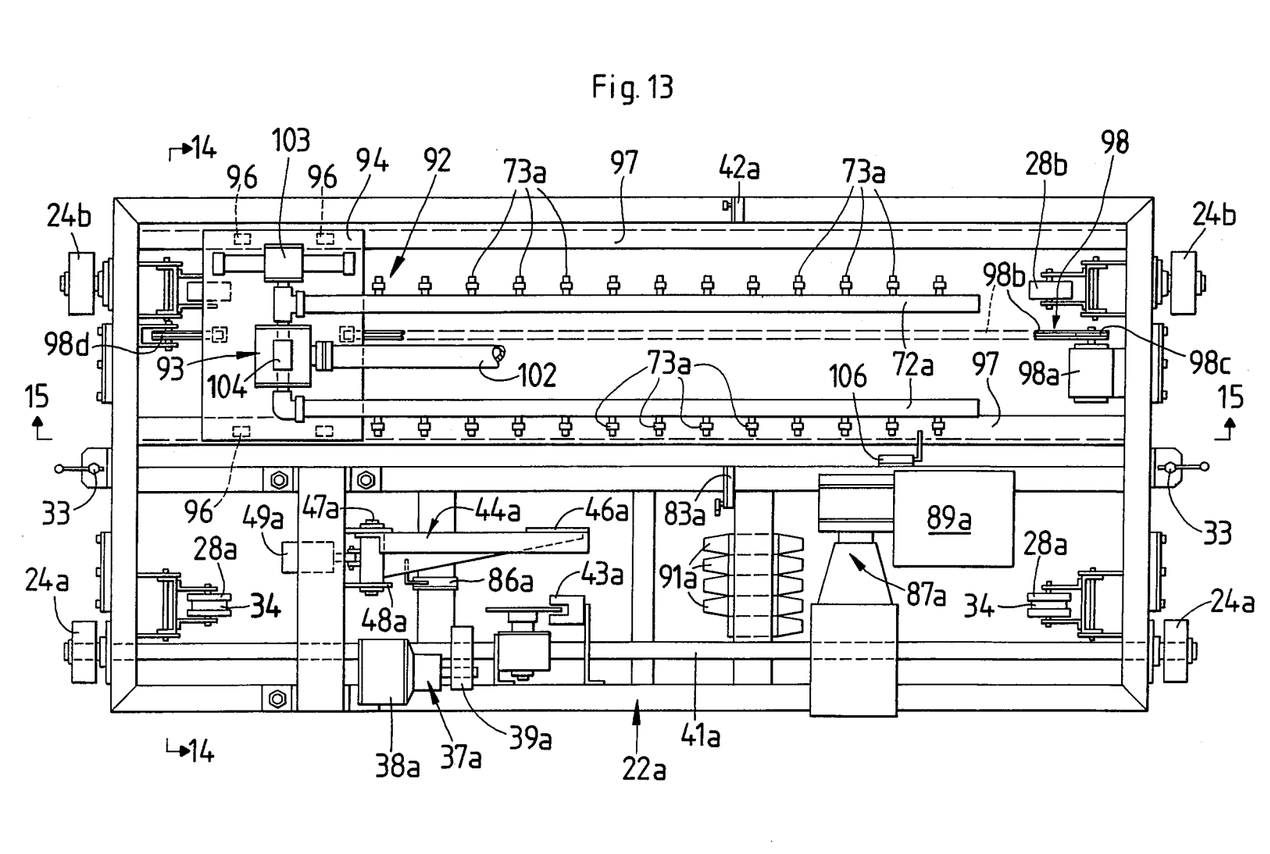
FIG. 13 is a top plan view showing a modified form of my improved spraying apparatus.
Figure 14:
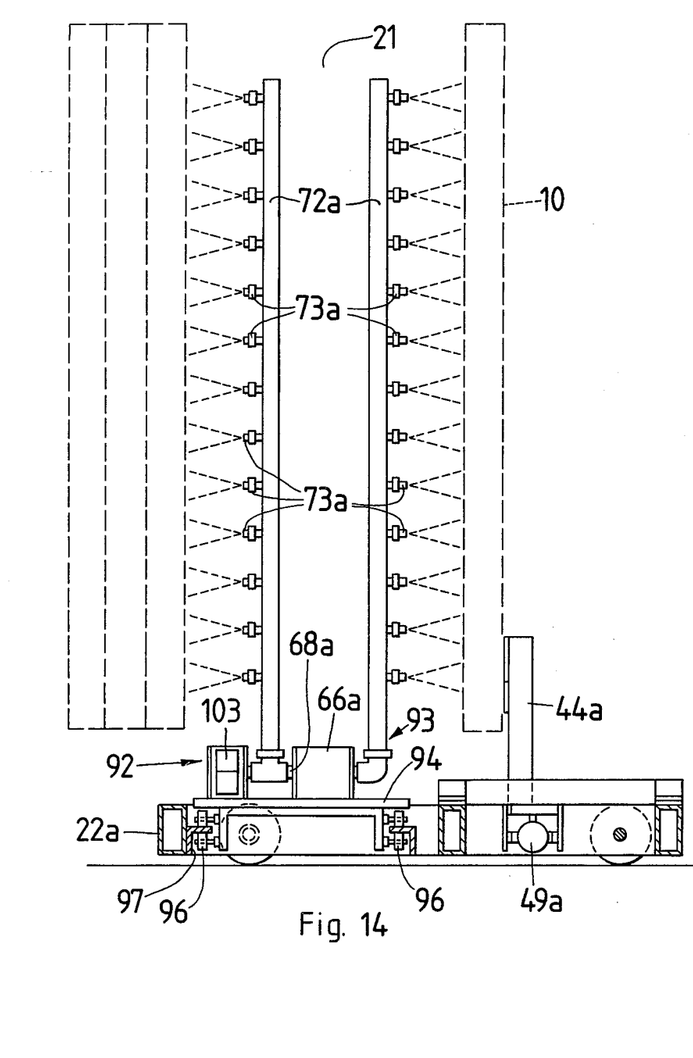
FIG. 14 is a sectional view taken generally along the line 14—14 of FIG. 13 and showing the spraying unit pivoted to its second or operating position; and, FIG. 15 is a sectional view taken generally along the line 15—15 of FIG. 13 showing the spraying unit in its first position beneath the filter press.
Figure 15:
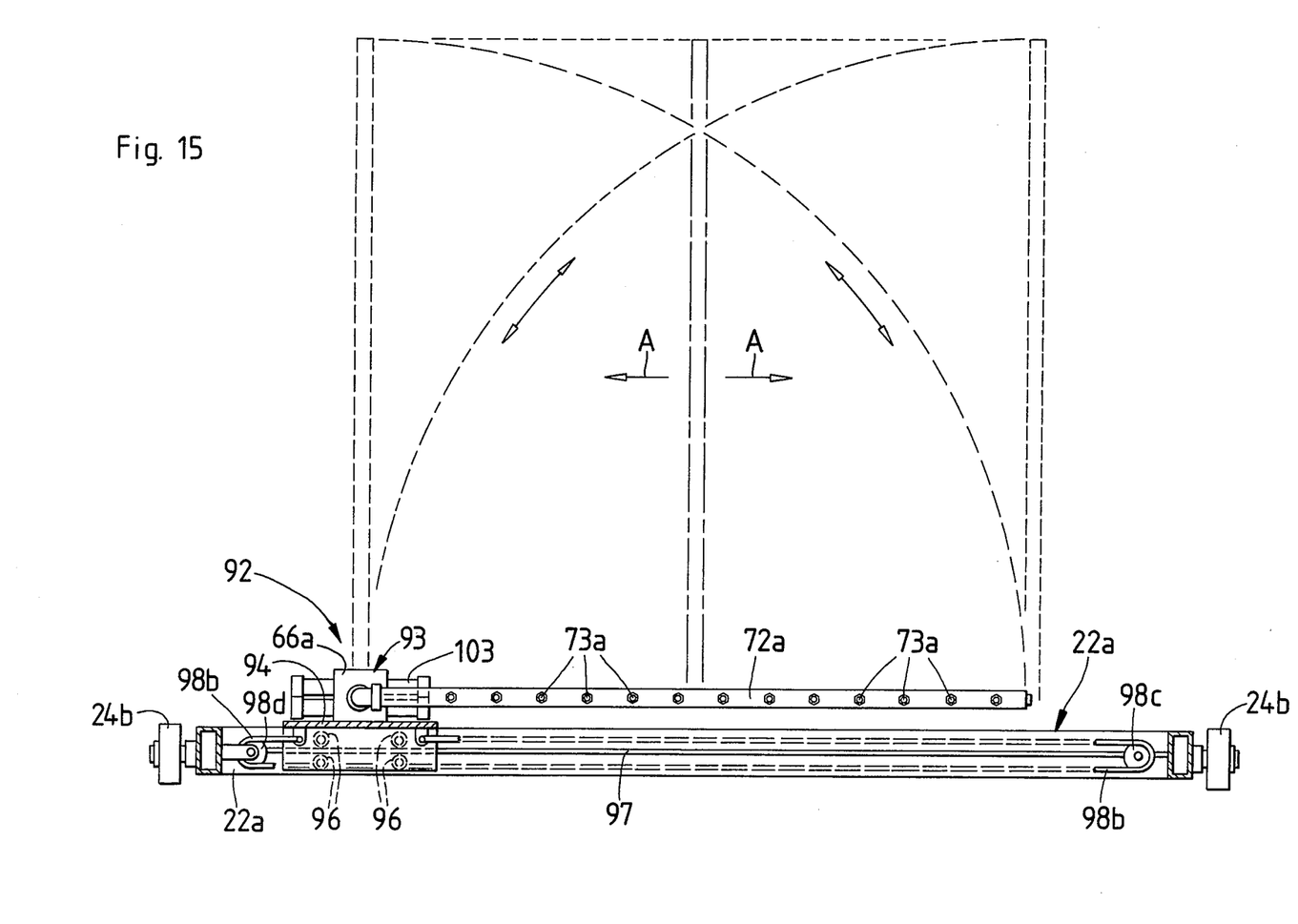

Referring now to FIGS. 13, 14 and 15, I show a modified form of my invention which is particularly adapted for use in cleaning square or rectangular filter plates. This improved form of my invention includes a fluid-tight tubular support frame 22$^a$ which is mounted for longitudinal movement beneath a conventional elongated filter press having a plurality of vertically extending rectangular filter plates 10$^a$. The support frame 22$^a$ is identical to the support frame 22 described above and aligns with each space 21 defined between adjacent filter plates 10$^a$ in the same manner as the support frame 22. That is, wheels 24$^a$, 24$^b$ and 28$^a$, 28$^b$ are mounted on the support frame 22$^a$ in the same manner as described with the first embodiment and provide means for moving the support frame longitudinally beneath the filter plates 10$^a$ and laterally relative to adjacent filter presses which extend in parallel relationship to each other.

A conventional hydraulic drive unit 37$^a$, such as a reversible hydraulic motor 38$^a$, is mounted on the support frame 22$^a$ for imparting longitudinal movement thereto, as shown. The reversible motor 38$^a$ is operatively connected by a power transmitting unit 39$^a$ to an elongated drive shaft 41$^a$ which extends between the wheels 24$^a$. The power transmitting unit 39$^a$ may be in any suitable form, such as a pulley and belt drive assembly, a chain and sprocket drive or the like.

A conventional hydraulically operated brake 43$^a$ is carried by the support frame 22$^a$ to positively stop and lock the support frame in alignment with each space 21 defined between adjacent filter plates 10$^a$ to be cleaned.

A stop assembly 44$^a$ is carried by the support frame 22$^a$ and is mounted for pivotal movement to selected positions relative to the support frame in the same manner as the stop assembly 44 described above. The stop assembly 44$^a$ includes a stop arm 46$^a$ which is pivotally connected by a pin 47$^a$ to a mounting bracket 48$^a$ carried by the support frame 22$^a$. An actuator 49$^a$, such as a hydraulic cylinder, pivots the stop arm to a raised or first position wherein it engages a filter plate 10$^a$ which has been moved off the stack of filter plates to be cleaned. The actuator 49$^a$ also pivots the stop arm to a lowered or second position beneath the filter plates 10$^a$, thus permitting free longitudinal travel of the support frame 22$^a$ beneath the filter plates 10$^a$. The stop arm 46$^a$ thus retains the filter plate moved off the stack at a predetermined distance from the adjacent filter plate in the stack to be cleaned. Accordingly, this predetermined distance between adjacent filter plates defines the space 21, as shown in FIG. 14.

A spraying unit, indicated generally at 92, is carried by the support frame 22$^a$ and is adapted for pivotal movement to selected positions relative to the support frame, as shown. That is, the spraying unit 92 is adapted to pivot to a lowered or first position as shown in solid lines in FIG. 15, where it extends beneath the filter plates 10$^a$ to thus permit free longitudinal travel of the support frame 22$^a$ beneath the filter press. The spraying unit 92 is also movable to a raised or second position, shown in dotted lines, wherein the spraying unit extends vertically into the space 21 defined between adjacent filter plates 10$^a$ to be cleaned.

The spraying unit 92 comprises a spray dispenser 93 which is mounted for rectilinear movement on the support frame 22$^a$, as shown by arrows "A" in FIG. 15. That is, the spray dispenser is carried by a supporting member, such as a plate-like member 94, having suitable supporting rollers 96 which engage elongated angle guide members 97, as shown in FIGS. 13 and 15. A chain and sprocket drive assembly 98 imparts rectilinear transverse movement to the support member 94 and spray dispenser 93 carried thereby across the width of the support frame 22$^a$, as shown. That is, a reversible motor 98$^a$ is operatively connected to a roller chain 98$^b$ which in turn is connected to the supporting plate-like member 94. The motor 98$^a$ thus rotates the chain 98$^b$ over sprockets 98$^c$ and 98$^d$ whereby the plate-like member 94 is moved back and forth across the width of the support frame 22$^a$.

The spray dispenser 93 comprises a fluid-tight housing 66$^a$ which is mounted on the support member 94 and is identical to the housing 66 described above. A cavity extends through the housing 66$^a$ and communicates with the outlet end of a flexible fluid supply conduit 102 in the same manner as the conduit 58 communicates with the housing 66. The fluid supply conduit 102 also communicates with a suitable cleaning fluid supply system as described above. A rotatable conduit 68$^a$ having elongated slots adjacent its mid portion extends through the housing 66$^a$ and is supported by suitable bearings for rotation with a fluid-tight fit. A spray manifold 72$^a$ having spaced apart spray nozzles 73$^a$ along one side thereof is secured to each end of the rotatable conduit 68$^a$, as shown in FIG. 13. When the spraying unit 92 is moved to its raised or second position, shown in dotted lines in FIG. 15, the spray nozzles 73$^a$ of each manifold 72$^a$ project laterally toward the vertical surface of an adjacent filter plate 10$^a$ to be cleaned.

A conventional rotary actuator 103 is operatively connected to the spray dispenser 93, as shown in FIG. 13. The rotary actuator is adapted to impart 90° pivotal movement to the spray dispenser selectively to its first or lowered position and its second or raised position within the space 21, as shown in solid and dotted lines, respectively, in FIG. 15. After the support frame 22$^a$ aligns the spraying unit 92 with the space 21, the rotary actuator 103 pivots the spray dispenser 93 from its lowered position to its raised position between the adjacent filter plates 10$^a$ forming the space 21, as shown in FIG. 14. The chain and sprocket drive assembly 98 then moves the spray dispenser across the width of the filter plates and to the other side of the space 21. If this pass across the plates provides sufficient cleaning, the rotary actuator 103 will pivot the spray dispenser back to its first or lowered position beneath the filter plates. The support frame 22$^a$ then would be ready to move forward to the next space 21. If additional passes are required, the spray manifolds 72$^a$ would remain in the raised or second position and would move back and forth across the width of the filter plates until the desired number of passes is completed.

Each time the spray dispenser 93 is pivoted to its raised or second position, cleaning fluid, such as water under pressure, is pumped through the flexible fluid supply conduit 102 into the cavity of the housing 66$^a$. The cleaning fluid then passes through the elongated slots of the rotatable conduit 68$^a$ and enters each spray manifold 72$^a$ where it is discharged through the nozzles 73$^a$ as the spray dispenser traverses within the space 21.

A conventional hydraulic pump assembly 87$^a$ is carried by the support frame 22$^a$, as shown. The assembly 87$^a$ communicates with a tank or reservoir 89$^a$ and a reservoir formed by the fluid tight tubular support frame 22$^a$ itself to supply hydraulic fluid to the drive motor 38$^a$, brake 43$^a$, stop assembly 44$^a$ and the rotary actuator 103. Suitable control valves 91$^a$ regulate the flow of hydraulic fluid in this system.

Limit switches 42$^a$, 83$^a$ and 86$^a$ are mounted on the support frame 22$^a$ at approximately the same locations and perform substantially the same functions as the limit switches 42, 83 and 86 described above with respect to the first embodiment of my invention.

A limit switch 104 is carried by the housing 66$^a$ of the spray dispenser 93 and is activated by rotation of the spray manifolds 72$^a$ a predetermined angular distance from their lowered or first position toward their raised or second position to direct cleaning fluid into the spraying unit 92. The limit switch 104 also energizes the drive motor 98$^a$ for the chain and sprocket drive assembly 98.

A limit switch 106 is carried by the support frame 22$^a$ and is activated by the rectilinear movement of the plate-like member 94 across the width of the support frame 22$^a$. The limit switch 106 reverses the direction of the motor 98$^a$ whereby the plate-like member 94 is returned to the other side of the support frame 22$^a$.

From the foregoing description, the operation of my improved spraying apparatus for cleaning rectangular filter plates as shown in FIGS. 13, 14 and 15 will be readily understood. With the filter plates 10$^a$ in their closed working positions and the support frame 22$^a$ beneath the filter press adjacent the tail stand 17$^a$, the support frame 22$^a$ is driven forward until the limit switch 42$^a$ is tripped by the closed stack of filter plates 10$^a$. This stops the drive motor 38$^a$, activates the brake 43$^a$ and pivots the stop assembly 44$^a$ to its raised position. A filter plate separator, such as separator 19 described in my first embodiment, engages the rearmost filter plate and moves it toward the open position. The traveling filter plate actuates the limit switch 83$^a$ which in turn deenergizes the drive means for the filter plate separator and raises the spraying unit 92 to its second position, as shown in FIG. 15. The unit switch 104 is activated by the pivotal movement of the spraying unit 92 to direct cleaning fluid into the spraying unit 92 and start the reversible drive motor 98$^a$ for the drive assembly 98. The spray manifolds 72$^a$ are then moved across the space 21 to apply spray to the adjacent surfaces of the filter plates being cleaned. At the end of this pass across the space 21, the limit switch 106 may be activated to reverse the drive motor for the chain and sprocket drive assembly 98 and return the spray manifold 72$^a$ to their original positions. If additional passes are required, the spray manifolds 72$^a$ will remain in the raised or second position and then be moved back and forth across the space 21 until the desired number of passes have been made. The spraying unit 92 and the stop assembly 44$^a$ then pivots downwardly beneath the filter plates 10$^a$. Downward movement of the stop assembly 44$^a$ activates the limit switch 86$^a$ to release the brake 43$^a$ and energize the drive motor 38$^a$ which moves the support frame 22$^a$ forward until the limit switch 42$^a$ is activated again. The sequence of steps described above are then repeated until the entire stack of filter plates 10$^a$ have been cleaned.

From the foregoing, it will be seen that I have devised an improved spraying apparatus for cleaning filter plates. By providing spraying apparatus which is adapted to travel beneath the filter press, I have eliminated the cumbersome and complicated overhead supports and drive assemblies heretofore employed with conventional spraying apparatus. Also, by providing a support frame which is adapted for lateral movement to operative positions beneath adjacent filter presses which extend in parallel relation to each other, I overcome the need for each filter press to have its own filter plate washer. Furthermore, by providing spraying apparatus which automatically moves into alignment with the space defined between adjacent filter plates independently of the judgment of an operator, I provide a filter plate washer which is very efficient in operation and eliminates the use of hand operated hose assemblies heretofore employed for washing filter plates.

While I have shown my invention in two forms, it will be be obvious to those skilled in the art that it is not so limited but is susceptible of various other changes and modifications without departing from the spirit thereof.

What I claim is:

1. Spraying apparatus for cleaning filter plates of a filter press wherein said plates are adapted for separation along longitudinally extending horizontal guides to define a space between adjacent filter plates,
   (a) a support frame mounted for longitudinal movement beneath said filter press and adapted for alignment with said space defined between adjacent filter plates to be cleaned, (b) an elongated arm pivotally connected at one end to said support frame for pivotal movement thereon selectively to a first position beneath said filter plates to permit free longitudinal travel of said support frame beneath said filter press and to a second position with said elongated arm in alignment with and extending into said space so that upon movement of said elongated arm to said second position the other end thereof extends inwardly of said space toward the mid portions of said adjacent filter plates, (c) a fluid supply conduit carried by said elongated arm and having an inlet adjacent said one end of said elongated arm connected to means supplying a cleaning fluid under pressure and having an outlet adjacent said other end thereof, (d) an elongated spray dispenser mounted for rotation at one end to said other end of said elongated arm and adapted to rotate at least 360° within said space upon movement of said elongated arm to said second position, with said dispenser being rotatable in at least one direction to apply spray over the vertical surfaces of said adjacent filter plates being cleaned, (e) actuator means carried by said support frame for pivoting said elongated arm to said first and said second positions, and (f) means carried by said elongated arm for imparting rotation to said spray dispenser.

2. Spraying apparatus for cleaning filter plates as defined in claim 1 in which said spray dispenser comprises, (a) a fluid-tight housing carried by said other end of said elongated arm and having a cavity therein in communcation with said outlet of said fluid supply conduit, (b) a rotatable conduit extending through said housing in communication with said cavity and adapted for rotation relative to said housing with a fluid-tight fit and operatively connected to said means imparting rotation to said spray dispenser, and (c) a spray manifold carried by each end of said rotatable conduit and having spaced apart, laterally disposed spray nozzles along one side thereof directed toward the vertical surface of the filter plate adjacent thereto.

3. Spraying apparatus for cleaning filter plates as defined in claim 1 in which said spray dispenser is rotatable in said space in said one direction and in a reverse direction to apply spray over said vertical surfaces of said adjacent filter plates.

4. Spraying apparatus for cleaning filter plates of a filter press wherein said plates are adapted for separation along longitudinally extending horizontal guides to define a space between adjacent filter plates, 1(a) a support frame mounted for longitudinal movement beneath said filter press and adapted for alignment with said space defined between adjacent filter plates to be cleaned, (b) an elongated spray dispenser carried by a fluid-tight housing and mounted for pivotal movement on said support frame selectively to a first position beneath said filter plates to permit free longitudinal travel of said support frame beneath said filter press and to a second position with said spray dispenser in alignment with and extending vertically into said space between said adjacent filter plates in position to apply spray over the vertical surfaces of said adjacent filter plates being cleaned, (c) means connected to said spray dispenser for supplying a cleaning fluid under pressure thereto upon pivotal movement of said spray dispenser to said second position, (d) actuator means operatively connected to said spray dispenser for imparting pivotal movement thereto, (e) said fluid-tight housing having a cavity therein in communication with said means supplying said cleaning fluid under pressure to said spray dispenser, (f) a rotatable conduit extending through said housing in communication with said cavity and adapted for rotation relative to said housing with a fluidtight fit and operatively connected to said actuator means pivoting said spray dispenser, and (g) at least one spray manifold carried by said rotatable conduit and having spaced apart spray nozzles thereon for applying spray to said vertical surfaces of said adjacent filter plates being cleaned.

5. Spraying apparatus for cleaning filter plates as defined in claim 4 in which a spray manifold is carried by each end of said rotatable conduit with said spaced apart spray nozzles being positioned along one side of each manifold and directed toward the adjacent vertical surface to be cleaned.

6. Spraying apparatus for cleaning filter plates as defined in claim 1 in which a stop arm is mounted for pivotal movement on said support frame with actuator means carried by said support frame for pivoting said stop arm selectively to a first location in position to engage a filter plate moved away from the stack of filter plates to be cleaned and retain said filter plate at a predetermined distance from its adjacent filter plate to be cleaned and to a second location beneath said filter plates to permit free longitudinal travel of said support frame beneath the filter press.

* * * * *